United States Patent
McConnell

(10) Patent No.: US 7,407,346 B2
(45) Date of Patent: Aug. 5, 2008

(54) METHODS AND APPARATUS FOR AIR CONVEYOR DUST EMISSION CONTROL

(75) Inventor: Larry D. McConnell, Lee's Summit, MO (US)

(73) Assignee: General Electric Company, Schenectady, NY (US)

( * ) Notice: Subject to any disclaimer, the term of this patent is extended or adjusted under 35 U.S.C. 154(b) by 736 days.

(21) Appl. No.: 10/976,372

(22) Filed: Oct. 29, 2004

(65) Prior Publication Data

US 2006/0093444 A1 May 4, 2006

(51) Int. Cl.
*B65G 53/60* (2006.01)
(52) U.S. Cl. .................. 406/171; 406/89; 406/172
(58) Field of Classification Search .................. 406/88, 406/89, 171, 172; 414/676, 291
See application file for complete search history.

(56) References Cited

U.S. PATENT DOCUMENTS

| | | | |
|---|---|---|---|
| 3,822,919 A | 7/1974 | Strom | |
| 3,870,374 A | 3/1975 | Wentzel, Jr. et al. | |
| 4,305,210 A * | 12/1981 | Christensen et al. | 34/583 |
| 4,411,674 A * | 10/1983 | Forgac | 55/304 |
| 4,699,187 A | 10/1987 | Binzen | |
| 4,714,097 A * | 12/1987 | Binzen et al. | 141/5 |
| 4,787,783 A * | 11/1988 | Girardelli | 406/106 |
| 5,053,063 A | 10/1991 | Sisk | |
| 6,227,768 B1 | 5/2001 | Higuchi et al. | |
| 6,609,871 B2 | 8/2003 | Pfeiffer et al. | |
| 6,719,500 B2 | 4/2004 | Pfeiffer et al. | |
| 6,764,253 B1 | 7/2004 | Pfeiffer | |

* cited by examiner

*Primary Examiner*—Douglas A Hess
(74) *Attorney, Agent, or Firm*—Greg Strugalski, Esq.; Armstrong Teasdale LLP

(57) ABSTRACT

A collector assembly is configured to vent dust-laden air through at least one filter in one direction using pressure in an air conveyor, whereby dust collects on one side of the filter or filters. The collector assembly is further configured to pulse compressed air through the filter or filters in an opposite direction to dislodge the collected dust into the air conveyor without the dislodged dust entering the atmosphere around the air conveyor.

9 Claims, 4 Drawing Sheets

METHODS AND APPARATUS FOR AIR CONVEYOR DUST EMISSION CONTROL

BACKGROUND OF THE INVENTION

This invention relates generally to pollution control and more particularly to methods and apparatus for reducing and recovering dust emissions from air conveyors.

Air conveyors are used for moving very dry, fluid materials, such as powdered substances at cement plants, lime plants, pharmaceutical plants, paint plants, and other facilities. The powdered material being moved is typically very fluid, and resembles face powder in that regard. At least one known fluidizing air conveyor has two chambers joined at a horizontal flange. In fact, the flange is not actually horizontal, but rather is inclined slightly (for example, at 7 to 8 degrees) to allow the conveyor to advantageously utilize the force of gravity to move the fluidized material from a silo or other material reservoir. An air-permeable fabric or felt is sandwiched in the flange. Below the flange, one of the chambers is an open metal box with pressurized air covered by the fabric. Because of the pressure differential between the lower chamber and the upper chamber (in some typical instances, for example, between 3 to 5 psi or 20.67 to 34.45 kpascal), air "bubbles up" through the fabric. Powder is dropped from a reservoir such as a silo into an opening in the elevated end of top chamber 18. That powder is transferred some distance (e.g., 50 to 100 feet in some cases) to where it is used or otherwise dispensed. By fluidizing the material with the pressurized air bubbled through the fabric and through the product, the material flows more easily. The slight incline allows gravity to cause the fluidized material to flow down the conveyor. The chamber below the fabric or felt is pressurized and the air supports and fluidizes the material so that it flows down, assisted by the air.

In some known configurations, a bottom chamber of the air conveyor is 2-4" (5.08-10.16 cm) tall and up to 24" (60.96 cm) wide, and a top chamber is 4-12" (10.16-30.48 cm) tall and up to 24" (60.96 cm) wide, depending upon how much material is being moved. The powdered material flows over the fabric that is laid as a top cover over the lower chamber, and flows down what is effectively a long, rectangular tube. Various types of fabrics are used in known configurations, depending upon the type of material being conveyed. For example, for very hot material, NOMEX® fabric (available from DuPont Corporation) can be used. For materials at room temperature, a polyester, felt polyester or other woven material can be used.

In known configurations, when the pressurized air exits at the discharge area for the conveyed material, the escaping air has a tendency to carry material dust into the atmosphere. Although a baghouse is sometimes used to prevent the material dust from entering the atmosphere, many material conveyors are in areas that are not generally accessible with low headroom clearances. In such installations, there is no room for a baghouse. In other cases, a baghouse is not practical to provide or is too expensive, because there also must be some way of collecting dust in the baghouse and feeding it back into the air conveyor, and a fan is required.

BRIEF DESCRIPTION OF THE INVENTION

In some aspects, some configurations of the present invention therefore provide a method for controlling dust emissions from air conveyors. The method includes pressurizing the air conveyor, using the air conveyor to convey a powdered material from one location to another, and venting an upper chamber of the air conveyor through at least one filter in a collector assembly mechanically attached to the upper chamber using pressure in the air conveyor. The filter or filters are pulsed with pressurized air during operation of the air conveyor to dislodge material adhering to the filter and deposit the adhered material into the air conveyor.

In other aspects, some configurations of the present invention provide an air conveyor for transferring powdered material from one place to another. The conveyor has a lower chamber configured to receive pressurized air and an upper chamber on top of the lower chamber. An air-permeable slide is between the upper chamber and the lower chamber. The conveyor also includes a collector assembly having at least one filter, wherein the upper chamber is mechanically attached to the collector assembly and the upper chamber is configured to vent through the filter or filters. In addition, the collector assembly is configured to utilize pressurized air during operation of the air conveyor to pulse the filter or filters to dislodge material adhering to the filter or filters and deposit the adhered material into the air conveyor.

In yet other aspects, some configurations of the present invention provide a collector assembly for an air conveyor. The collector assembly includes a housing configured to accept at least one filter, to mechanically attach to an upper chamber of an air conveyor, and to receive pressurized air containing a powdered material from below. The housing is further configured to filter the pressurized air through the filter or filters, when the filter or filters is/are installed in the housing. The collector assembly also includes a reservoir of compressed air. The collector assembly is also configured to pulse compressed air into the filter or filters to dislodge material from the filter or filters and to drop the material into the air conveyor.

In still other aspects, some configurations of the present invention provide a collector assembly configured to vent dust-laden air through at least one filter in one direction using pressure in an air conveyor, whereby dust collects on one side of the filter or filters. The collector assembly is further configured to pulse compressed air through the filter or filters in an opposite direction to dislodge the collected dust into the air conveyor without the dislodged dust entering the atmosphere around the air conveyor.

Many configurations of the present invention require no fan, starter, motor or energy to operate and are simple to install. The pressure already in the air conveyor can be used, in some configurations, by merely hooking a compressed air line into one end of a header. Filters used in some configurations of the present invention are economical and can last for years.

DETAILED DESCRIPTION OF THE INVENTION

Figure 1:
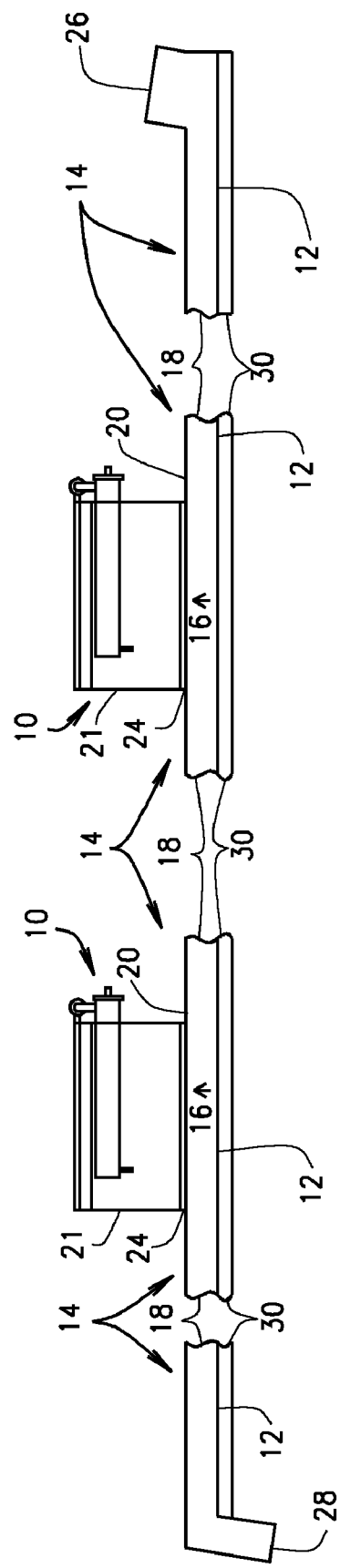
FIG. 1 is a side elevational view of a configuration of an air conveyor having installed thereon dust reducing collector assemblies.

Referring to FIG. 1, collector assemblies 10 are used in some configurations of the present invention to depressurize the volume above an air-permeable slide 12 of a pressurized air fluidizing conveyor 14 (air conveyor) after the pressurized air has performed its function. More particularly, some configurations of the present invention advantageously vent spent, dust-laden air 16 above slide 12 in a top or upper chamber 18 of conveyor 14. This venting is performed without material dust escaping into the atmosphere around the conveyor. Air conveyor 14 is either an existing air conveyor being retrofitted or a new air conveyor. Slide 12 can be any suitable material and is a fabric slide in some configurations.

Configurations of the present invention provide one or more collector assemblies 10 attached, or attachable, to air conveyor 14. The number and size of collector assemblies 10 can be selected in accordance with the size of air conveyor 14 and how much powdered material and air are passing through it.

In various configurations of the present invention, an opening is cut or is otherwise provided on a top cover 20 of air conveyor 14. A collector assembly 10 comprising a box 21 (e.g., a metal box) is positioned above the opening. Box 21 has an opening (not shown in FIG. 1) at its bottom to allow dust-laden air 16 to vent into assembly 10, and has a top that permits filtered air to escape, as is explained below. Pressurized air passing through slide 12 enters the top chamber and is forced through filters 22 (shown in hidden lines, as they are behind a wall of collector assembly 10 in FIG. 2). Periodically, collector assembly 10 is cleaned by pulsing a blast of compressed air down the center of filters 22, causing material dust carried by the pressurized air to fall off and back into air conveyor 14. No material handling equipment is required to clear filters 22 of this material, nor is an airlock required. Thus, existing pressure in air conveyor 14 is utilized to convey air through one or more filters 22 in collector assembly or assemblies 10 and also to relieve pressure in the top chamber 18 of air conveyor 14. In some configurations, filters 22 are pleated filters.

Figures 2, 3:
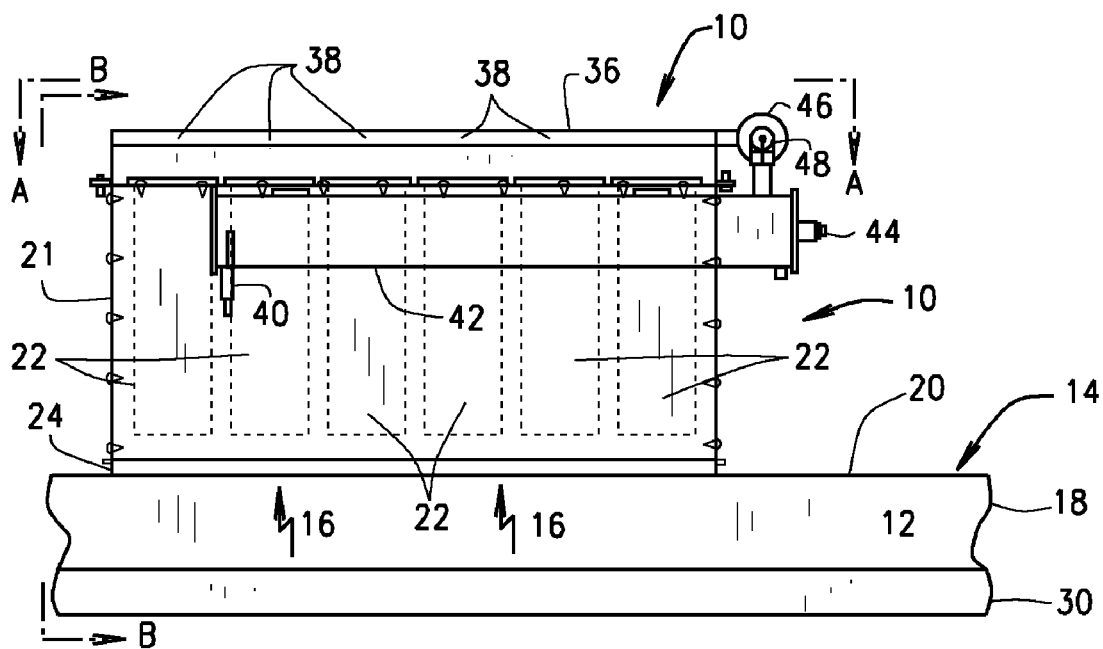
FIG. 2 is a side elevational view of a single collector assembly of FIG. 1 showing internal filters with hidden lines.
FIG. 3 is a top plan view of a collector base flange.

In some configurations and referring to FIG. 1, a plurality of collector assemblies 10 are provided for an air conveyor 14, which can be, for example and not by way of limitation, over 100 ft or 30.43 m long. Collector assembly 10 is bolted on the top of top cover 20 of conveyor 14 using a collector base flange 24 such as illustrated in FIG. 3.

Air conveyor 14 is tilted slightly off horizontal and is used to convey material from a point at or near its high or top end 26 to a point at or near its low or bottom end 28, as shown in FIG. 1. The powdered material slides down slide 12 between top chamber 18 and bottom chamber 30 of air conveyor 14. A silo or other storage apparatus (not shown in the Figures) is located at a feed point at or near top end 26 of air conveyor 14. The silo can be filled with powdered material to be conveyed to low end 28 of air conveyor 14. For example only, and not by way of limitation, the conveyed material may be cement or lime. This material feeds into the opening in air conveyor 14 from a hopper, e.g., a rotary feeder. The material is dropped into conveyor 14 and is conveyed 108 ft (32.92 m) to another location at or near low end 28 of air conveyor 14 in the configuration illustrated in FIG. 1.

In some configurations of the present invention, one or more collector assemblies 10 are fitted on top of air conveyor 14, which itself has a housing (such as a metal housing) comprising an upper or top chamber 18 and a lower or bottom chamber 30. Bottom chamber 30 is about 4 to 6 in (10.16 to 15.24 cm) tall and is flanged. Top chamber 18 can be slightly taller than bottom chamber 30 and is also flanged. A top chamber 18 that is taller than bottom chamber 30 advantageously accommodates a larger volume of flowing material on top of the air-permeable slide 12, which is held in place between the flanges of chambers 18 and 30. Air entrances are not shown in the Figures, but are provided in bottom chamber 30. In some configurations, these air entrances are provided at intervals of 10 to 15 ft (3.048 to 4.572 m), but this interval is not considered part of the present invention and can be varied as a design choice for different conveyor applications. A header and a high pressure blower (also not shown in the Figures) are provided to create an air overpressure. This overpressure in some configurations is or can be, for example, about 3 to 5 psi (20.67 to 34.45 kpascal). The blower blows air into bottom chamber 30 below slide 12, and this overpressure passes or "bubbles up" through slide 12 along its entire length and width (other than a portion held in place between the flanges).

A slotted opening is cut for collector base flange 24 (shown in FIG. 3) in top cover 20 of top chamber 18 of air conveyor 14. In some configurations in which a 100 ft (30.48 m) air conveyor 14 is used, a slotted opening is cut at 27 ft (8.23 m) from either end, for example. This distance can be selected empirically to provide the best pressure relief and can vary in other configurations. An opening is cut to match collector base flange 24, which is placed on the top of upper chamber 18 and welded in place to provide a slotted opening to which collector assembly 10 is bolted. One or more pleated filters 22 are provided in collector assembly 10 to collect material dust blown about by the escaping pressurized air. Off-the-shelf polyester filters such as PULSEPLEAT® filters (available from BHA Group Holdings, Inc., Kansas City, Mo.) can be used as pleated filters 22.

Figure 4:
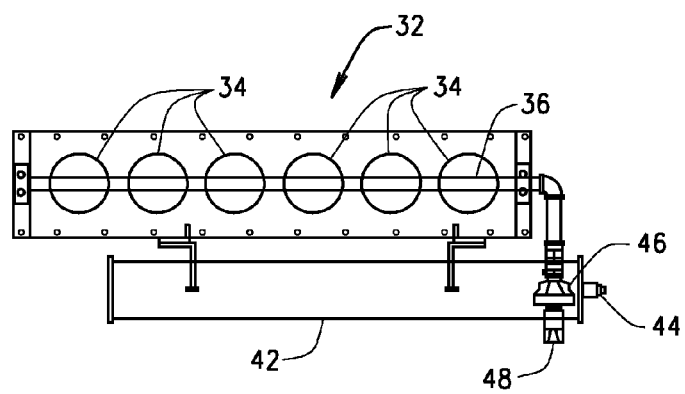
FIG. 4 is a top plan view of the single collector assembly of FIG. 2.
Figure 5:
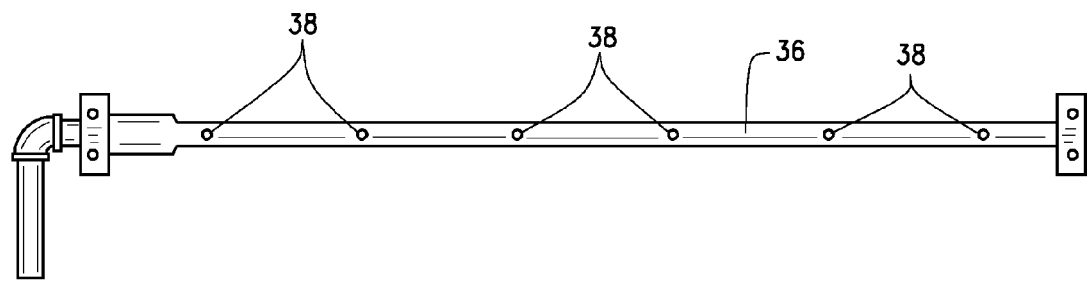
FIG. 5 is a view of the blow pipe of FIG. 4 shown looking up from the location of the installed filters.

In some configurations of the present invention and referring to FIG. 4, a row of six pleated filters 22 are fitted on a heavy bolt flange or plate 32 near the top of assembly 10. A series of six openings 34 are provided in bolt flange or plate 32 near the top of collector assembly 10. Filters 22 are inserted in openings 34 and hang essentially vertically ("essentially vertically" is used herein to mean an orientation between vertical and slightly off of vertical by approximately an amount equal to the slope of the air conveyor), supported by plate or flange 32. In some configurations, filters 22 are dropped through openings 34 and fitted with an airtight snap or press fit, so that air leaving air conveyor 14 passes first into an open area within box 21 of collector assembly 10, then through pleated filters 22, and from filters 22 into the atmosphere. An essentially horizontal (i.e., between horizontal and off horizontal by approximately an amount equal to the slope of the air conveyor) blow pipe 36 of collector assembly 10 can be removed to allow filters 22 to be installed. After filters 22 are snapped in, blow pipe 36 is replaced. Pulsed compressed air is provided through six openings 38 (i.e., at least one opening 38 for each filter 22) in pipe 36, as shown in FIG. 5. This pulsed compressed air is directed downward into the center of filters 22 to cause the pleats in filters 22 to expand slightly and dislodge material dust that has collected on the filters. The dislodged material dust falls back down onto air conveyor slide 12 and is recovered without the dust entering the atmosphere around air conveyor 14. More particularly, collector assembly 10 is configured to vent dust-laden air through filter or filters 22 in one direction using the pressure in air conveyor 14, whereby the dust collects on one side of filters 22. Collector assembly 10 is also configured to pulse compressed air through filter or filters 22 in the opposite direction to dislodge the collected dust back into air conveyor 14 without the dislodged dust entering the atmosphere around air conveyor 14.

Figure 6:
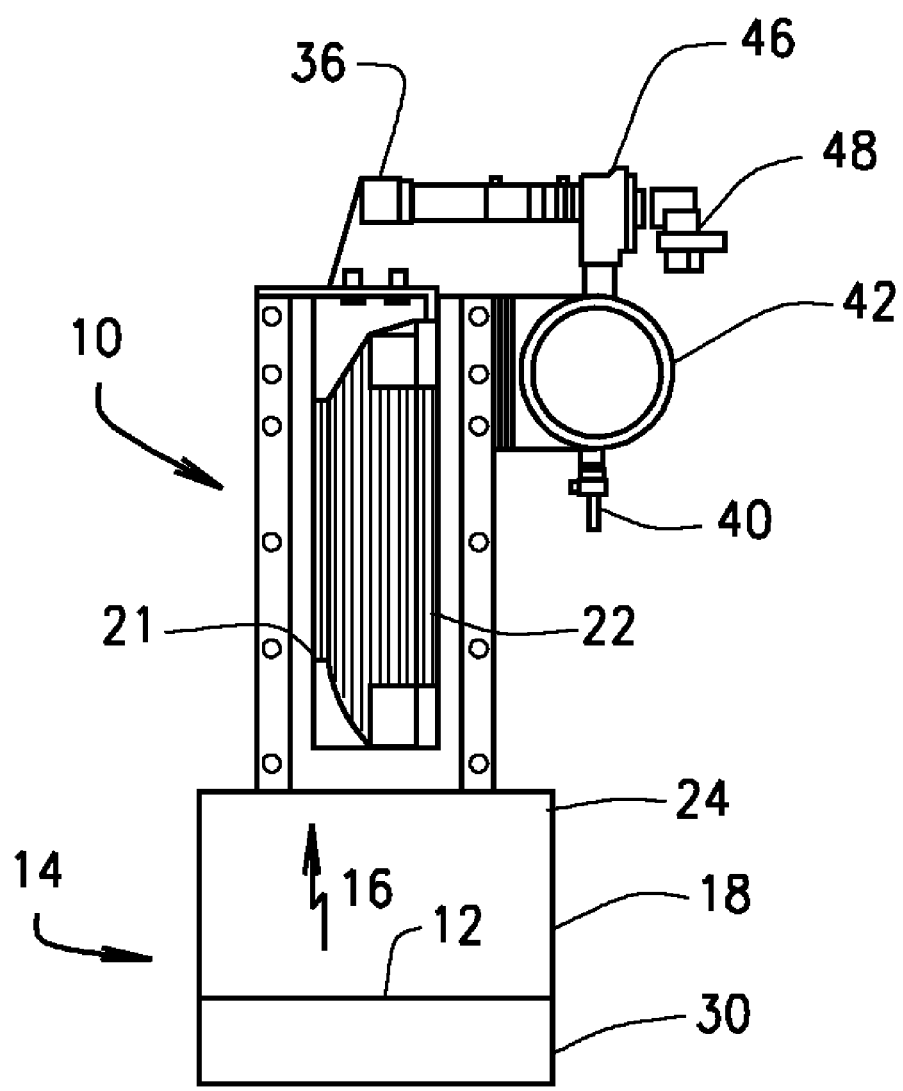
FIG. 6 is a partial cut-away side view of the single collector assembly of FIG. 2 shown on top of the air conveyor of FIG. 1.

In some configurations and referring to FIG. 6, a manual purge valve 40 is provided to allow draining of condensed moisture from a compressed air tank or reservoir 42, which, in some configurations, draws its supply of compressed air from the compressed air used to pressurize air conveyor 14. The supply of compressed air is drawn through header assembly 44.

A pulse or diaphragm valve 46 is actuated by an electrical signal to cause it to open up for between about 100 ms or 200 ms in some configurations. Pressurized air in reservoir 42 passes through valve 46 and through blow pipe 36 to openings 38 aligned directly over filters 22. In this manner, a blast of compressed air is pulsed from pipe 36 down the center of pleated filters 22, causing the pleats to be flexed. This flexing causes dust adhering to filters 22 to fall off into conveyor 14. Thus, instead of emerging uncontrollably into the atmosphere through openings in the walls or joints of air conveyor 14, escaping material dust is collected on the one or more pleated filters 22 and "blasted" back onto the slide 12 of air conveyor 14. More particularly, pressurized, dust-laden air 16 impinges on one side of each pleated filter 22, and the dust adheres to that side while the pressurized air escapes through the filters. Only clean air escapes into the atmosphere. As material dust cakes onto filters 22, the flow of air through filters 22 is reduced, so some configurations periodically clean filters 22 with a pulsed blast of pressurized air. A variable timer 48 is provided in some configurations to allow a pulse period to be set. In some configurations, timer 48 can be set for a period between about 30 seconds to about 10 minutes. Timer 48 is set to cause an electrical pulse to occur at an interval that can be selected and/or adjusted empirically in the field to provide the best filtering performance. Factors affecting the setting of the timer (or the range provided by a supplied timer 48) may include the type of material being conveyed, the mesh of the material being conveyed, the weight of the material, how well the material dust adheres to filters 22, how difficult it is to clean filters 22 in the field, and so forth. Once collection assembly 10 is in operation, these parameters are not difficult to observe and/or determine, nor are the results of a timing adjustment.

In some configurations of the present invention, pleated filter or filters 22 comprise spun, bonded polyester filter material. For example, filter 22 can comprise a stiffened polyester pleated into an accordion-like shape. In some other configurations, pleated NOMEX® filters (available from E. I. du Pont de Nemours and Company, Wilmington Del.) are used. Fiberglass filters can be used for high temperature air conveyors. PTFE (polytetrafluoroethylene) membrane can be placed on the surface of pleated filter 22 if required. For example, if the powdered material is especially fine, or sticks tightly to the pleats so that slicker pleats are required, a pleated PTFE membrane can be placed on filter 22, if the extra cost is acceptable in the intended application. In configurations in which more than one filter is used, the filters need not be the same type or material. For many applications, however, spun bonded polyester filters without a PTFE membrane are suitable.

Some configurations of the present invention can be shipped knocked down and bolted together in the field. Moreover, configurations of the present invention can be used in locations in which there is not enough clearance for a baghouse.

In some configurations of the present invention, the air moves passively through filters 22 and is then allowed to escape into the atmosphere. In other configurations, the pressure inside the air conveyor is insufficient to force the pressurized air through the filters. Thus, in some configurations, a cap with a fan is provided on the top of the assembly above the filters and air is forced through the filters using a vacuum.

In an exemplary embodiment, collector assemblies 10 are placed on and work in concert with existing air conveyors. Pressure that is already provided for the operation of the air conveyor is used to force air through filters 22 without requiring a separate fan, motor, starter, or wiring for the fan, etc. No other air conveyor filtering or air pollution control device is utilized in most installations.

While the invention has been described in terms of various specific embodiments, those skilled in the art will recognize that the invention can be practiced with modification within the spirit and scope of the claims.

What is claimed is:

1. An air conveyor for transferring powdered material from one place to another, said conveyor comprising:
   a lower chamber configured to receive pressurized air;
   an upper chamber on top of the lower chamber;
   an air-permeable slide between said upper chamber and said lower chamber;
   a collector assembly comprising at least one filter positioned above a surface of said conveyor, wherein said upper chamber mechanically attached to said collector assembly and said upper chamber configured to vent through said at least one filter;
   and further wherein said collector assembly configured to utilize pressurized air during operation of said air conveyor to pulse said at least one filter to dislodge material adhering to said at least one filter and deposit the adhered material into the air conveyor.

2. A conveyor in accordance with claim 1 wherein said collector assembly configured to pulse said at least one filter periodically during operation of said air conveyor.

3. A conveyor in accordance with claim 2 further comprising a timer configured to control the periodic pulsing.

4. A conveyor in accordance with claim 3 further configured to open a valve for between about 100 and 200 ms to periodically pulse said at least one filter, and wherein said timer is configured to set a pulsing interval between 30 seconds and 10 minutes.

5. A conveyor in accordance with claim 1 wherein said collector assembly comprises a plurality of filters, and a pipe oriented substantially horizontally above said filters, said pipe includes openings configured to deliver a pulse of compressed air into a center of said filters.

6. A conveyor in accordance with claim 1 further comprising a collector base flange, and wherein said collector assembly is bolted on top of an opening in said upper chamber through said collector base flange.

7. A conveyor in accordance with claim 1 further comprising a reservoir of pressurized air configured to pulse said at least one filter, and a purge valve configured for manual purging condensed moisture from said reservoir.

8. A conveyor in accordance with claim 1 wherein said at least one filter comprises a filter selected from the group consisting of spun, bonded polyester filters, Nomex filters, fiberglass filters, filters having a PTFE membrane, and combinations thereof.

9. A conveyor in accordance with claim 1 wherein said at least one filter is a pleated filter.

* * * * *